(12) United States Patent
Berliner et al.

(10) Patent No.: US 7,139,581 B2
(45) Date of Patent: Nov. 21, 2006

(54) METHOD AND SYSTEM FOR DISTANCE MEASUREMENT IN A LOW OR ZERO INTERMEDIATE FREQUENCY HALF-DUPLEX COMMUNICATIONS LOOP

(75) Inventors: Shlomo Berliner, Kiriat Ono (IL); Alan Bensky, Gan Yavne (IL); Reuven Amsalam, Neo-Zione (IL); Gil Baver, Rosh-Ha'ayin (IL); Daniel Aljadaff, Kiriat Ono (IL)

(73) Assignee: AeroScout, Inc., Rehovot (IL)

( * ) Notice: Subject to any disclaimer, the term of this patent is extended or adjusted under 35 U.S.C. 154(b) by 460 days.

(21) Appl. No.: 10/137,954

(22) Filed: May 2, 2002

(65) Prior Publication Data

US 2004/0203470 A1 Oct. 14, 2004

(51) Int. Cl.
*H04Q 7/20* (2006.01)
(52) U.S. Cl. ............... 455/456.1; 455/11.1; 455/67.11; 455/67.16; 342/118; 342/127
(58) Field of Classification Search ............. 455/67.11, 455/16, 418–421, 502–503, 456.1, 139, 11.1, 455/67.16; 342/42, 47, 118, 125–132
See application file for complete search history.

(56) References Cited

U.S. PATENT DOCUMENTS 3,676,865 A * 7/1972 Strenglein .................... 365/73
3,680,092 A * 7/1972 Scott ............................ 342/85
3,790,940 A * 2/1974 Becker ........................ 342/125
4,011,562 A * 3/1977 Bruce .......................... 342/46
5,381,444 A * 1/1995 Tajima ....................... 375/141
5,546,032 A * 8/1996 Yatagai ...................... 327/165
6,608,587 B1 * 8/2003 Sparrow et al. ............ 342/188
2003/0012306 A1 * 1/2003 Alexander et al. .......... 375/316

* cited by examiner

*Primary Examiner*—Matthew Anderson
*Assistant Examiner*—Tuan Tran
(74) *Attorney, Agent, or Firm*—Jeffrey D. Moy; Harry M. Weiss; Weiss & Moy, P.C.

(57) ABSTRACT

A method and system for distance measurement in a low or zero intermediate frequency (IF) half-duplex communications loop measures the distance between two transceivers without synchronizing the local oscillators of the two transceivers. Transceiver distance may be measured in systems that use direct conversion (zero IF) or intermediate frequencies that are so low that phase noise significantly reduces the accuracy of the distance measurement. The communications loop demodulates, re-modulates and retransmits a received signal to provide a re-transmitted signal that has the same carrier and modulation frequency as the received signal. A phase-hold circuit provides an analog system for half-duplex operation that retains the frequency and phase information of the received signal for retransmission in a subsequent time slot. Alternatively, a digital implementation provides phase and frequency retention via a sample and delay system comprising an analog-to-digital conversion (ADC) subsystem, a first-in-first-out (FIFO) memory and a digital-to-analog (D/A) converter.

26 Claims, 6 Drawing Sheets

METHOD AND SYSTEM FOR DISTANCE MEASUREMENT IN A LOW OR ZERO INTERMEDIATE FREQUENCY HALF-DUPLEX COMMUNICATIONS LOOP

CROSS-REFERENCE TO RELATED APPLICATIONS

The present application is related to previously-filed United States Patent Applications assigned to the same assignee and having at least one common inventor: "ACCURATE DISTANCE MEASUREMENT USING RF TECHNIQUES", Ser. No. 09/759,601 filed Jan. 16, 2001; "SYSTEM AND METHOD FOR REDUCING MULTIPATH DISTORTION IN WIRELESS DISTANCE MEASUREMENT SYSTEMS", Ser. No. 09/759,600, filed Jan. 16, 2001; and "DISTANCE MEASUREMENT USING HALF-DUPLEX RF TECHNIQUES", Ser. No. 09/759,602, filed Jan. 16, 2001. The specifications of the above-referenced U.S. Patent Applications are herein incorporated by reference.

BACKGROUND OF THE INVENTION

1. Field of the Invention

The present invention relates generally to distance measuring systems, and more specifically, to a method and system for measuring a distance between transceivers having a low or zero intermediate frequency.

2. Background of the Invention

A multitude of wireless communications systems are common use today. Mobile telephones, pagers and wireless-connected computing devices such as personal digital assistants (PDAs) and laptop computers provide portable communications at virtually any locality. As described in the above-incorporated patent applications, the above-listed portable devices as well as other communication systems may be enhanced to provide distance measurement capability within portable or stationary wireless devices.

In particular, BLUETOOTH devices provide a wireless network operating in the 2.4 Ghz Industrial Scientific and Medical band and be enhanced to provide a measurement of distance between connected devices without adding a separate infrastructure as is required with systems such as the Global Positioning System (GPS), thereby providing distance measurement with low incremental cost (BLUETOOTH is a trademark of Bluetooth SIG, Inc., which is an acronym for Bluetooth Special Interest Group—a consortium of wireless device manufacturers).

The techniques described in the above-incorporated patents introduce distance measurement capability within transceivers that are synchronized by a relatively high Intermediate Frequency (IF), but modern Radio Frequency (RF) Integrated circuit (IC) designs may use a very low IF frequency or a direct conversion scheme with no IF frequency at all. In a transceiver implemented using a low or zero IF frequency, synchronization of the devices involved in the distance measurement becomes impractical, and thus the known distance measuring schemes are thwarted by the lack of synchronization.

In particular, the half-duplex techniques described in the above-incorporated patent application "DISTANCE MEASUREMENT USING HALF-DUPLEX RF TECHNIQUES" are techniques that require synchronization of a pair of transceivers to retain phase coherency between reception and transmission intervals of a half-duplex signal. Without synchronization, a phase measurement cannot be made and therefore no distance measurement. In a direct conversion half-duplex system or a half-duplex low IF system where synchronization is impractical, implementation of the known distance measurement techniques is impossible.

Therefore, it would be desirable to provide a method and system for measuring distance within a low or zero IF transceiver loop, so that distance between wireless devices may be made without requiring additional infrastructure and without synchronization of local oscillators between wireless devices.

SUMMARY OF THE INVENTION

The above objective of providing a distance measurement in a low or zero intermediate frequency half-duplex communications loop is achieved in a method and system. The method is embodied in a system that transmits a radio-frequency (RF) signal from a measuring device to a measured device. The measured device receives the RF signal during a reception interval and demodulates the received RF signal with a local oscillator having a predetermined frequency differing from the local oscillator frequency of the measuring device. The resulting down-converted signal phase and frequency information is stored during the reception interval and retained until after the end of the reception interval. During a subsequent transmission interval, the measured device up-converts a signal having a phase and frequency in conformity with the stored phase and frequency information using the measurement device local oscillator and transmits the up-converted signal. The resulting signal transmitted from the measured device is of the same frequency as the received RF signal and is synchronized to the measurement device local oscillator. The transmitted signal is received at the measuring device and is used to measure the distance between the measuring device and the measured device.

The foregoing and other objectives, features, and advantages of the invention will be apparent from the following, more particular, description of the preferred embodiment of the invention, as illustrated in the accompanying drawings.

DETAILED DESCRIPTION OF THE PREFERRED EMBODIMENTS

Figure 1:
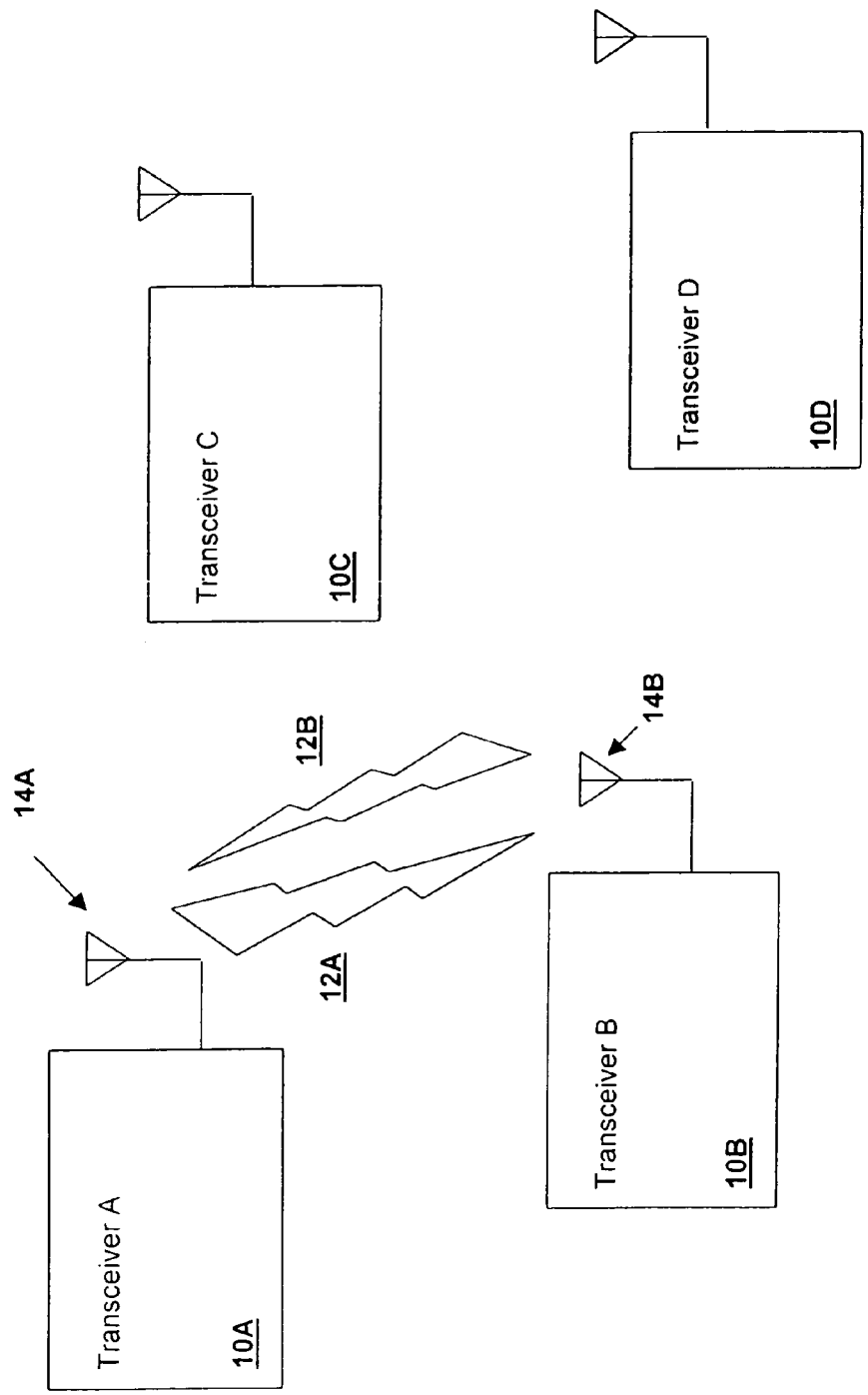
FIG. 1 is a pictorial diagram depicting a wireless network in which an embodiment of the invention is practiced.

Referring now to the figures and in particular to FIG. 1, a wireless network within which the present invention is embodied is depicted in a block diagram. A plurality of wireless devices 10A–10D inter-communicate via radio-frequency (RF) signals (for example 12A and 12B illustrating a communication between devices 10A and 10B) transmitted and received via antennas 14A and 14B. Wireless devices 10A–10D may be mobile telephones, personal digital assistants (PDAs), laptop computers with wireless modems, pagers, or other portable or non-portable devices that include wireless communications capability. Some devices in the associated wireless network may be receive-only or broadcast only, but in order to implement the distance measuring techniques of the present invention, a pair of transceivers is used, as a signal must be transmitted from a "measuring" device to a "measured" device and a second signal is then returned from the measured device.

Wireless devices 10A–10D are transceivers capable of communicating using a common protocol and frequency band of operation. For example, transceivers 10A–10D may be BLUETOOTH devices communicating in a band centered around 2.4 Ghz and having a bandwidth of approximately 80 Mhz. 79 channels are provided with a 1 Mhz bandwidth each, and the devices frequency hop at a rate of 1600 hops per second. A complete protocol, including communications control protocols and transport layer protocols are defined by the BLUETOOTH specification, providing a complete wireless networking solution. While the BLUETOOTH specification is of particular interest in wireless networking, it should be understood that the techniques of the present invention apply to wireless communication systems in general, and in particular to half-duplex communication systems using either direct conversion (zero IF) or low frequency IF signals.

The present invention measures distance using techniques similar to those described in the above-incorporated patent applications. The slope of phase versus frequency as measured around a communications loop and over a plurality of frequencies is used to determine the distance between a pair of transceivers. The ambiguities due to an unknown number of wavelengths between the transceivers and due to multi-path distortion is resolved by the use of multiple frequency measurements. The techniques and apparatus of the present invention further encompass distance measuring within systems using a continuously varying frequency (such as a linear "chirp" profile or other time-variant frequency profile) within a half-duplex communications system, as the techniques of the present invention provide a transceiver that is capable of transmitting a response signal that is coherent with a received signal without synchronization of local oscillators and it is this method and structure to which the invention particularly pertains.

Without a mechanism for overcoming the synchronization requirement, the far end of a communications loop using direct conversion cannot transmit a signal coherent with a signal received from the originating end of the communications loop. In particular, within a half-duplex system, the signal transmitted by the originating end is not available at the far end of the communications loop at the time of transmission by the far end of the communications loop and therefore phase information must be held until the time of transmission from the far end of the communications loop. This objective is accomplished by the method and structure disclosed in the above-reference patent application, but when implemented in a direct conversion system or system having a very low IF frequency, the locking of a local oscillator at the measured device is not possible as the phase comparison time for just one cycle of difference frequency can consume a large part of the reception interval.

The present invention concerns the structure and method by which the storing of phase information corresponding to the signal transmitted by the originating end of the communications loop (and thus the local oscillator and modulation source of the originating end) is achieved.

Figure 2:
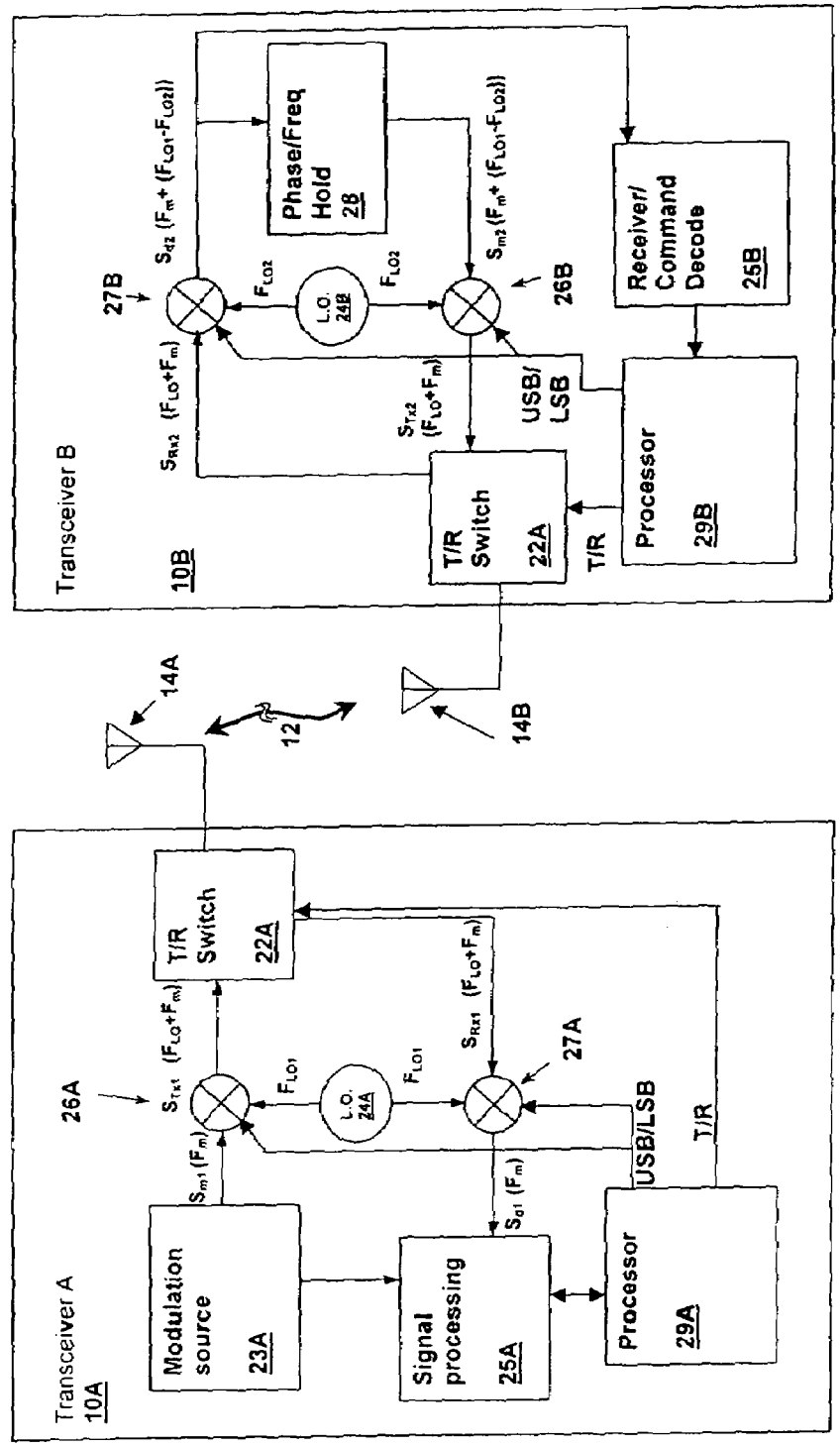
FIG. 2 is a block diagram depicting a communications loop within which the present invention is embodied.

Referring now to FIG. 2, a communications loop within which the present invention is embodied is depicted. Transceiver 10A and transceiver 10B are coupled by a wireless communication 12 through antennas 14A and 14B. Transceiver 10A is the "measuring" device for the purposes of illustration and transceiver 10B is the "measured" device, but the functional blocks, circuits and software/firmware required to implement the invention may be present in both transceivers or may be implemented in separate fashion as shown. In general, enhancements the measured device are required over prior art receivers, but the measurement device may be implemented in a fashion similar to the half-duplex transceiver described in the above-referenced patent application.

Modulation source 23A provides the source signal $S_{m1}$ of frequency $F_m$ that is up-converted by modulator 26A to provide RF transmit signal $S_{T\times1}$ that is broadcast through antenna 14A during a transmit time interval (time slot) as selected by T/R switch 22A. Local oscillator 24A provides the upconversion signal at frequency $F_{LO1}$ and therefore the transmitted RF signal $S_{T\times1}$ has a frequency of $F_{LO1}\pm F_m$ (where the sign is determined by selection of either upper sideband or lower sideband selected by a processor 29A). It should be understood that the techniques of the present invention may be applied to a sinusoidal waveform having a simple frequency as illustrated by the above equations, or to a more complex spectrum having discrete or continuous bandwidth for which $F_m$ represents a band of frequencies.

Transceiver 10B receives the RF signal corresponding to the $S_{T\times1}$ signal as received signal $S_{R\times2}$, which has the same frequency characteristics as $S_{T\times1}$, and a phase determined in part by the distance between transceiver 10A and transceiver 10B. Signal $S_{R\times2}$ is downconverted by a demodulator 27B producing demodulated signal $S_{d2}$ which has a frequency $F_m\pm(F_{LO1}-F_{LO2})$, where $F_{LO2}$ is the frequency of local oscillator 24B used to demodulate signal $S_{R\times2}$. The sign of the frequency equation above is again determined by a selection of upper/lower sideband demodulation which may be selected by processor 29B. Subsequent distance measurement signaling is then conducted by selecting upper or lower sideband modulation via the USB/LSB select signal. Alternatively, A counter or an FFT algorithm may be used to determine the frequency offset between the local oscillators (of the measuring device and measured device) at the measured device and this frequency offset information may be transmitted to the measuring device for use in correcting the phase measurements. As will be described below for a digital implementation of phase/freq hold 28 (28B of FIG. 4), this measurement is needed in one embodiment to determine the delay of the storage and conversion elements and is information already available.

Upper or lower sideband modulation is chosen to ensure that the frequency of $S_{d2}$ which has a frequency $F_m\pm(F_{LO1}-F_{LO2})$ sufficiently high to carry out the measurement. For example, in a BLUETOOTH system with a carrier frequency of 2.4 GHz and a local oscillator stability of 30 ppm, the frequency deviation due to local oscillator stability is ±72 Khz. By using $F_m$=75 Khz and selecting upper or lower sideband, a minimum demodulated frequency of approximately 75 Khz is maintained. For local oscillators deviating by 150 KHz in either direction the demodulated frequency will be 75 Khz, for deviations of 75 Khz the sideband yielding a demodulated 150 Khz (rather than zero) can be chosen and so forth, guaranteeing a 75 Khz minimum frequency from the output of demodulator 27B.

The proper sideband for modulation, chosen as described above to yield a minimum demodulated frequency at the measured device, can be chosen in several ways. One mechanism is to transmit a request from the measuring device to the measured device (using a command protocol) that causes the measured device to send a binary representation of a measurement of the difference frequency between the local oscillator reference clocks (for example, by measuring the deviation between the demodulated frequency and the expected demodulated frequency for a predetermined RF frequency). The estimated deviation is returned to the measuring device to inform the measuring device of the deviation between the local oscillators. Once the deviation is known, upper sideband or lower sideband modulation is selected by the measuring device to guarantee a minimum demodulated frequency within the measured device. The frequency deviation may be measured using an FFT algorithm, counter chain or other frequency measurement technique.

An alternative mechanism for selecting operating an sideband for modulation is for the measuring device to send a request (via a command protocol) to the measured device requesting that the measured device return one time interval of upper sideband demodulation and then one interval of lower sideband transmission (based on a fixed modulating reference within the measured device). The average of the two received frequencies at the measuring device yields the offset between the local oscillators, since the modulation deviation will subtract to remove contribution from the modulating source.

The output of demodulator 27B is measured (sampled) during the reception interval by a phase/frequency hold circuit 28. Phase/freq hold circuit 28 may be an analog system or a digital system as will be described in particular embodiments below. The phase and frequency information corresponding to the $S_{d2}$ signal is held until the transmission interval and the output of phase/freq hold 28 is upconverted by modulator 26B to produce a transmit signal $S_{Tx2}$, which has a carrier frequency of $F_{LO1} \pm F_m$ corresponding exactly to signal $S_{Tx2}$ transmitted from transceiver 10A and having a phase determined in part by the distance between transceiver 10A and transceiver 10B.

Transceiver 10A receives the signal transmitted from transceiver 10B during a reception interval as selected by T/R switch 22A and received signal $S_{Rx1}$ is demodulated by demodulator 27A to produce demodulated signal $S_{d1}$ which has a frequency of $F_m$ exactly the same as modulation source 23A output signal $S_{m1}$. The output of modulation source 23A and demodulated signal $S_{d1}$ are then compared by signal processing block 25 to determine a phase for that particular channel frequency. Multiple hop phase measurements are then used to determine a measured distance eliminating the effects of multipath and other path delays.

Figure 3:
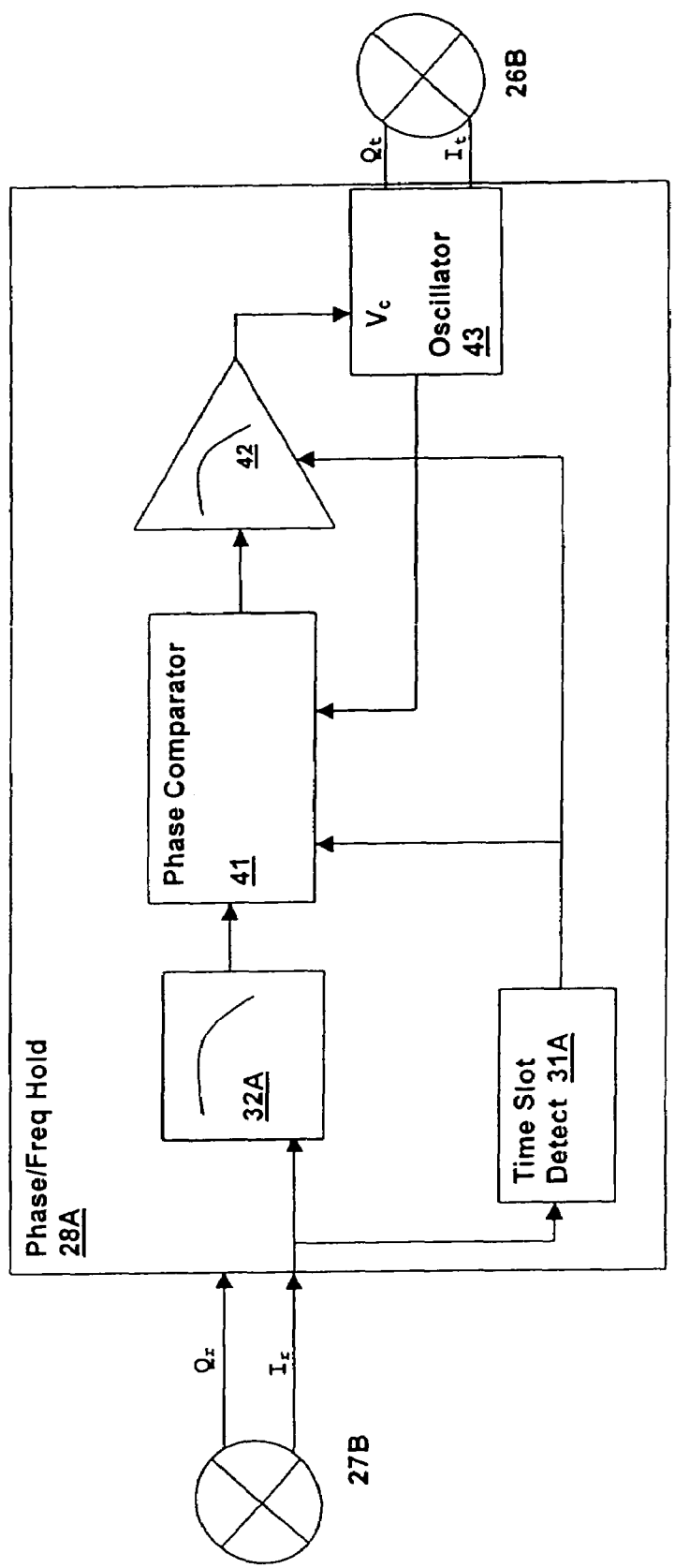
FIG. 3 is a block diagram depicting a phase-frequency hold circuit in accordance with an embodiment of the invention.

Referring now to FIG. 3, a transceiver in accordance with an embodiment of the invention is shown. A $Q_r$ and $I_r$ pair of quadrature signals are received from demodulator 27B. The input signal is filtered by a low-pass filter 32A and introduced to a phase comparator 41 that compares the phase of the demodulated signal with the output of a voltage-controlled oscillator (VCO) 43. Loop filter amplifier 42 filters the output of phase comparator 41 to provide a control voltage $V_c$ to set the frequency of VCO 43, thus forming a phase-lock loop. Phase comparator 41 and loop filter amplifier 42 include enable inputs coupled to a time slot detector 31A that disables the output of phase comparator 41 and puts loop filter amplifier in a "hold" state during the transmission interval (i.e., when $Q_r$ and $I_r$ are invalid because no signal is received during this interval).

The above-described phase/freq hold circuit thus holds the phase and frequency of the demodulated signal received during the reception interval until the transmission interval begins. Oscillator 43 provides a quadrature pair of output signals for input to modulator 26B and upconversion for transmission from the measured device. In this example, only the $I_r$ signal is coupled to the internal circuits, the $Q_r$ signal could be used alternatively or in conjunction with the $I_r$ signal (For example, phase comparator 41 could be a quadrature multiplier and both signals in the pair could be used for phase comparison after low-pass filtering). Also, time slot detect circuit 31A output may be supplied as an input signal from another block within a transceiver, as the detection of the time divisions are common to many other circuits within a typical transceiver. Time slot detection based on the detected quadrature output may or may not be preferable and is include as only an example of a mechanism for deriving synchronization to time slots.

Figure 4:
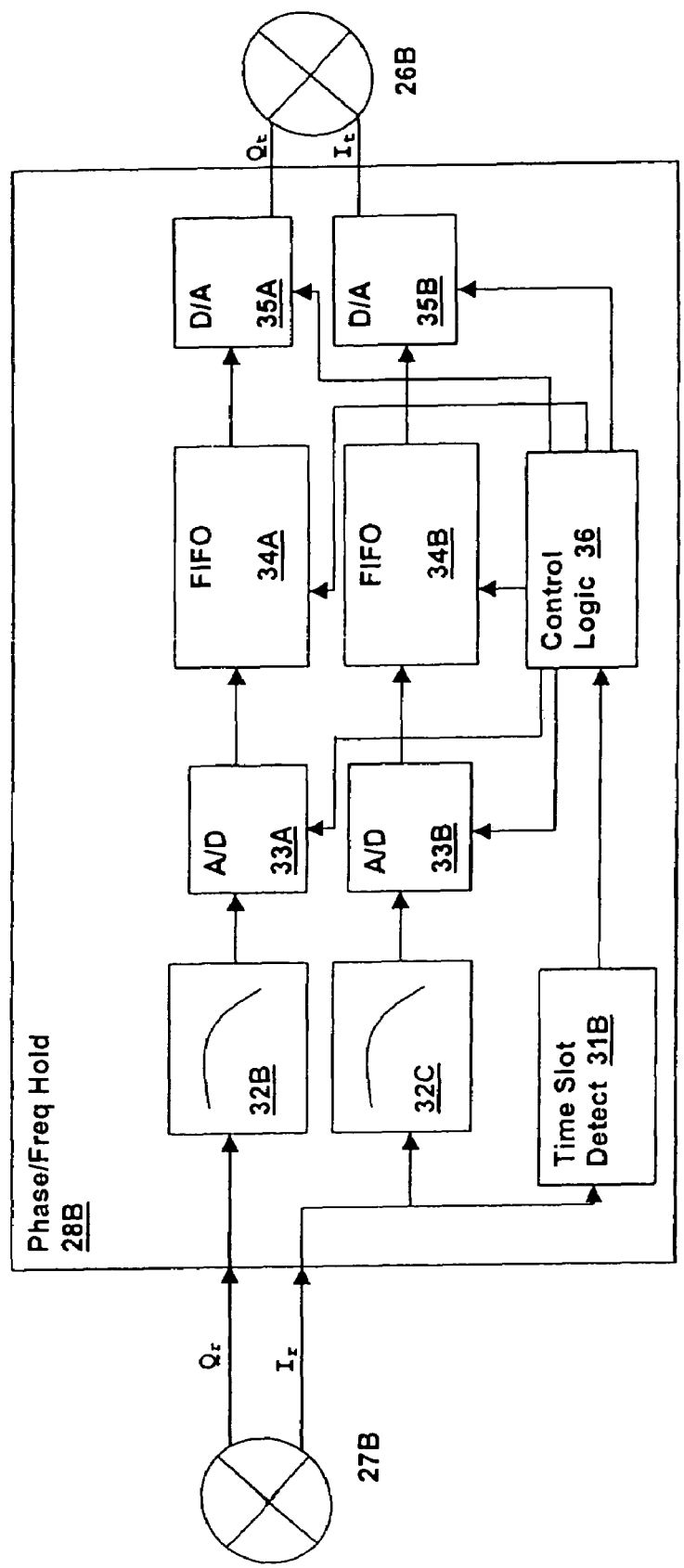
FIG. 4 is a block diagram depicting a phase-frequency hold circuit in accordance with an alternative embodiment of the invention.

Referring now to FIG. 4, a phase/freq hold circuit 28B in accordance with an alternative embodiment of the invention is depicted. In the embodiment shown, both quadrature signals $Q_r$ and $I_r$ are filtered by lowpass filters 32A and 32B and are subsequently sampled by A/D converters 33A and 33B. A control logic 36 controls the sampling process, which is synchronized to the reception time slot detected by time slot detect 31B. During the reception time interval, the sampled demodulated signals $Q_r$ and $I_r$ are stored in firstin-firstout (FIFO) memories 34A and 34B by control logic 36. During the transmission interval, the stored waveforms are "played back" by control logic 36 via D/A converters 35A and 35B. Thus, the phase and frequency and amplitude information of the demodulated signals $Q_r$ and $I_r$ are stored (as complete sampled waveforms of $Q_r$ and $I_r$) in FIFOS 34A and 34B until the transmission time interval. A phase delay through the conversion system and FIFO memories 34A is compensated within the distance measurement by one of a variety of means. A counter or an FFT algorithm may be used to determine the frequency offset between the local oscillators (of the measuring device and measured device) at either device and this frequency offset information may be transmitted from the measured device (in response to a request from the measuring device) to the measuring device for use in correcting the phase measurements. The time delay of the sampling system is a design parameter and can be taken into account as well as the conversion component delays, or this information may be stored within the measured device and transmitted to the measuring device. An alternative is to transmit a modulated signal from the measured device (during a specially designated time slot) and the processing subsystem within the measuring device can then determine the delay from the received modulated signal.

While the two embodiments depicted above represent a pure "analog" approach and a pure "digital" approach, other techniques may be used in accordance with other embodiments of the invention. For example, phase/freq hold 28A may use a "digital" phase comparator or a full digital phase-lock loop or phase/freq hold 28B may use an analog phase/frequency detection scheme and store values corresponding to frequency and phase rather than waveform samples. The present invention concerns: 1) demodulating the received signal with a reference frequency other than the reference frequency of the originating source, 2) storing the resulting intermediate frequency signals' phase and frequency information for later transmission, and 3) modulating a signal having a phase and frequency in conformity with the stored phase and frequency information with the same reference frequency used to demodulate the received signal to produce a signal for transmission.

Figure 5A:
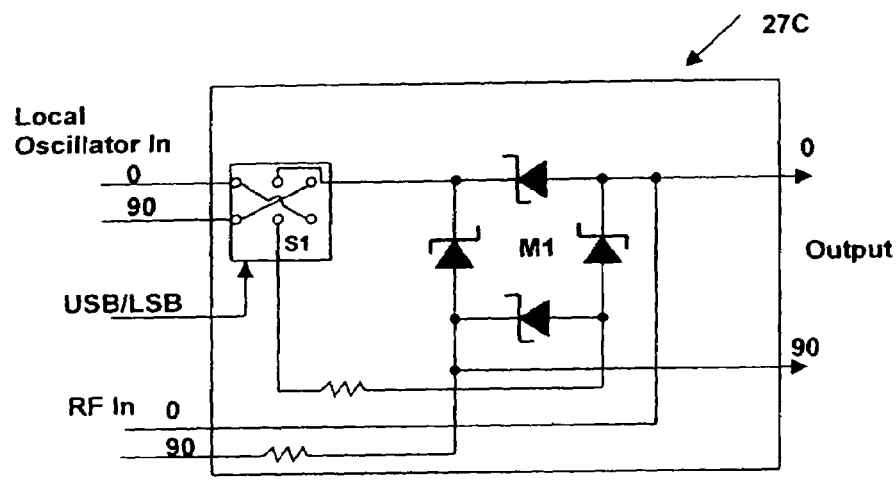
FIG. 5A is a schematic diagram depicting a selectable modulator/demodulator circuit that may be used within transceivers 10A and 10B of FIG. 2.

Referring now to FIG. 5A an exemplary modulator/demodulator circuit 27C that may be used within transceivers 10A and 10B of FIG. 2 is depicted. The signals are shown as configured for a demodulator, but it should be understood that a corresponding modulator circuit may be implemented by exchanging the RF In signal with a modulation input signal and demodulator output signals with RF Output signals. USB/LSB select signal controls switch S1 which determines which of the quadrature local oscillator output signals is applied to the local oscillator input nodes of mixer M1. The RF in signal (which is the modulation input signal for a modulator) is applied to mixer M1 providing a demodulated quadrature output at the Output signal pins. The illustration of FIG. 5A is provided as an example and it should be understood that other forms of selectable mixer circuits can be used in accordance with embodiments of the invention, such as BJT and FET mixers, as well as digital implementations such as XOR gate mixers.

Figure 5B:
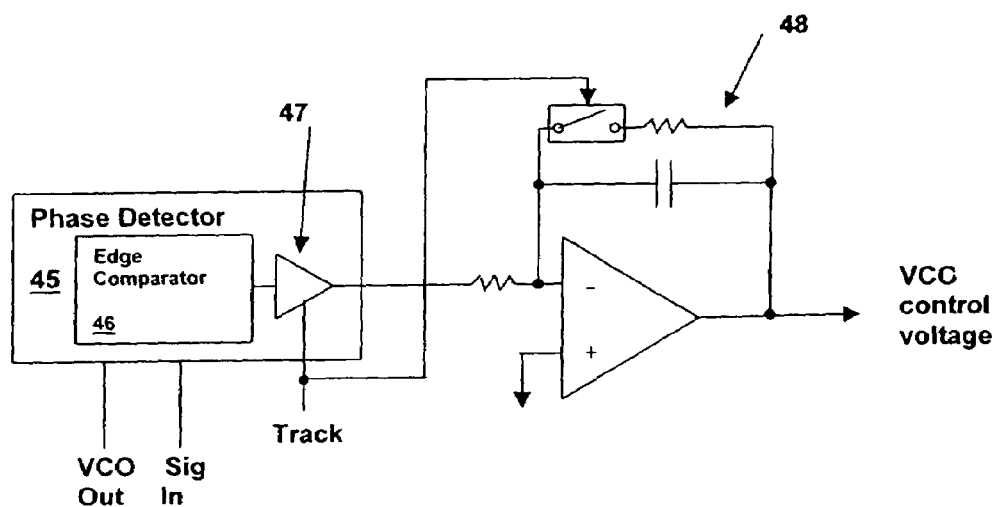
FIG. 5B is a schematic diagram depicting phase detector and loop filter circuit that may be used within the phase-frequency hold circuit of FIG. 3.

Referring now to FIG. 5B, a phase comparator/loop filter circuit that may be used within the phase/frequency hold circuit of FIG. 3 is depicted. Phase detector 45 includes an edge comparator that produces a signed output based on whether the VCO Out signal leads or lags the Sig In signal. When the Track input control signal is active (during the reception time slot), buffer 47 enables the signed output to charge or discharge loop filter 48. When the Track signal is inactive, the switch in loop filter 48 opens, placing loop filter 48 in a hold state (because the capacitor voltage can only change due to leakage). In general, any appropriate loop filter/phase detector can be used to implement the phase/frequency hold circuit as long as sufficient frequency agility and hold stability are achieved.

Figure 6:
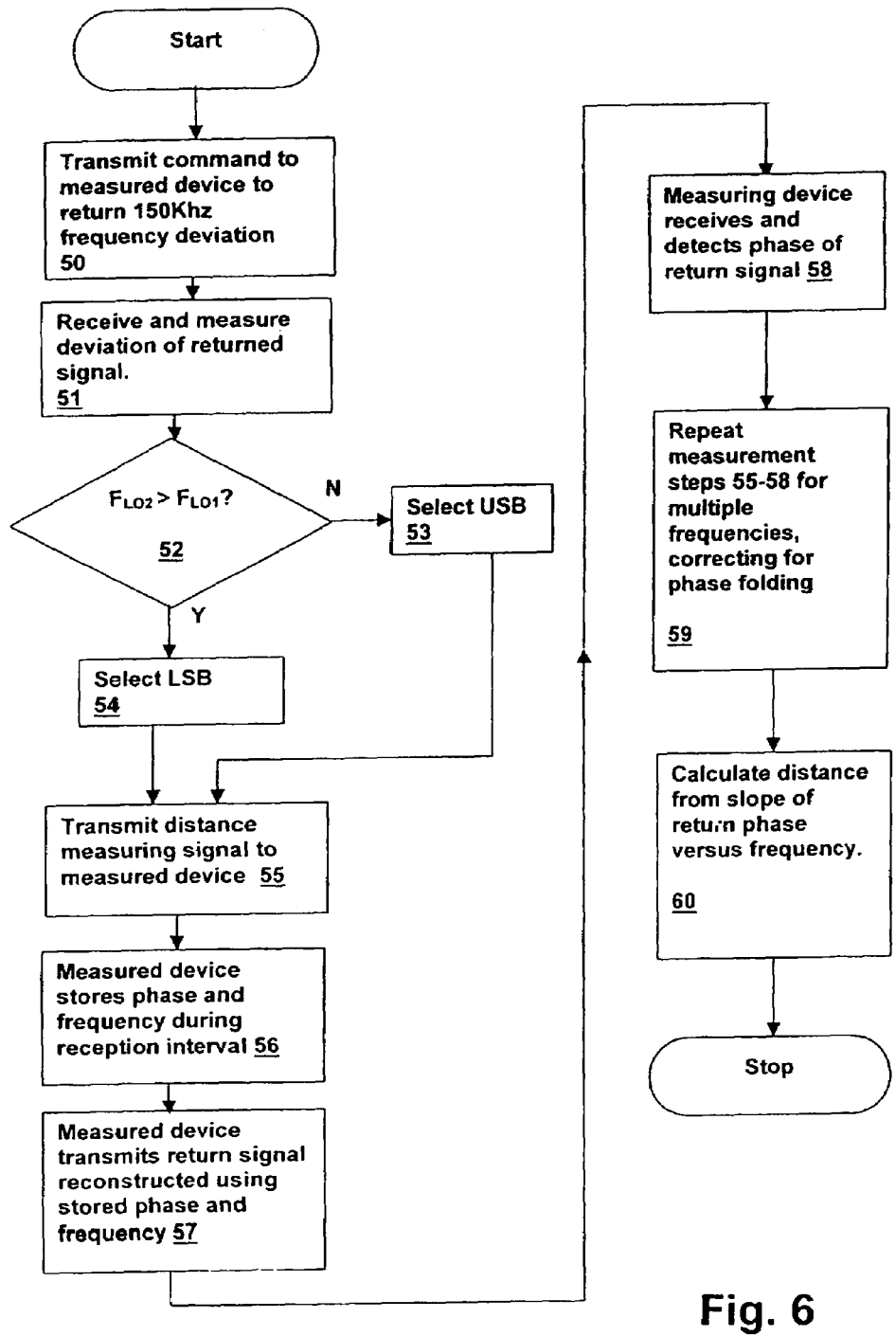
FIG. 6 is a flowchart depicting a method in accordance with an embodiment of the invention.

Referring now to FIG. 6, a method in accordance with an embodiment of the invention is depicted in a flowchart. The method illustrated is an exemplary method and variations in the order and use of certain steps is not a requirement, for example, the frequency deviation handshaking communications may be unnecessary for certain implementations of embodiments of the invention. First, a command is transmitted to the measured device to return a 150 KHz deviation signal (step 50). The deviation signal is transmitted from the measured device, received by the measuring device and the deviation is detected (step 51). If the local oscillator of the measured device has a higher frequency than the local oscillator of the measuring device (decision 52), the lower sideband is selected for subsequent distance measurement signaling (step 54). Otherwise the upper sideband is selected (step 53).

Next, the distance measuring signal is transmitted from the measuring device to the measured device (step 55) and the measured device stores frequency and phase information during the reception interval (step 56B). Then, the measured device transmits a return signal that is reconstructed from the stored frequency and phase information (step 57). The measuring device receives and detects the phase of the return signal (step 58). Steps 55 through 58 are repeated for multiple frequencies and the phase information is compensated for phase folding due to roll-overs of phase that occur (step 59). After all of the measuring frequencies have been sampled, the distance between the measured device and the measuring device is determined by the slope of phase versus frequency (step 60).

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method for measuring distance in a half-duplex communications loop comprising an originating transceiver and a repeating transceiver, comprising:
  receiving a first radio-frequency signal having a carrier frequency from among a plurality of carrier frequencies at said repeating transceiver during a reception time slot;
  downconverting said first radio-frequency signal to a intermediate frequency signal by demodulating said first radio-frequency signal with a local oscillator signal to produce a pair of quadrature demodulated signals at said intermediate frequency and generating a phase-lock reference signal locked to one of said pair of quadrature demodulated signals;
  retaining phase, frequency and amplitude information of said intermediate frequency signal within said repeating transceiver after the end of the reception time slot;
  upconverting said stored intermediate frequency signal to a second radio-frequency signal during a transmission time slot, said second radio-frequency signal having a carrier frequency equal to said carrier frequency of said first radio-frequency signal and a phase corresponding to said retained phase information of said first radio-frequency signal and an amplitude corresponding to said retained amplitude information of said first radio-frequency signal; and
  transmitting said second radio-frequency signal from said repeating transceiver during said transmission time slot, whereby said second radio-frequency signal may be received by said originating transceiver for determining a phase delay of said half-duplex communications loop.

2. The method of claim 1, wherein said upconverting comprises modulating said phase-lock reference signal with said local oscillator signal to produce said second radio-frequency signal.

3. The method of claim 1, further comprising:
  comparing a phase of said phase-lock reference signal to a phase of said one of said pair of quadrature demodulated signals during said reception time slot;
  integrating a result of said phase comparison to produce a phase reference signal;
  holding a result of said integrating during said transmission time slot, and wherein said generating uses said held result as a phase reference for generating said phaselock reference signal during said transmission time slot.

4. A communications transceiver, comprising:
  a receiver for receiving a first radiofrequency (RF) signal including a downconverter for producing an intermediate frequency signal output during a reception time interval;

a storage for storing frequency, phase and amplitude information of said intermediate frequency signal output after an end of said reception time interval;

a transmitter for transmitting a second radio-frequency signal, said transmitter including an upconverter for upconverting said stored frequency, phase and amplitude information of said intermediate frequency signal to produce said second radio-frequency signal; and a command decoder for receiving a request to transmit an upper sideband modulated signal and a lower sideband modulation signal during two subsequent time slots, whereby a remote device can determine the deviation of a local oscillator of said downconverter and said upconverter.

5. The communications transceiver of claim 4, wherein said storage is a digital memory circuit for storing values encoding said frequency, phase and amplitude information of said intermediate frequency signal output.

6. The communications transceiver of claim 5, wherein said storage further comprises:

at least one multi-bit analog-to-digital converter coupled to said intermediate frequency signal output and further coupled to said digital memory circuit for converting said intermediate frequency signal output to a digital numeric sequence and storing said digital numeric sequence during said reception time interval; and at least one multi-bit digital-to-analog converter coupled to said digital memory and further coupled to said upconverter for generating a signal corresponding to said digital numeric sequence after said end of said reception time interval.

7. The communications transceiver of claim 6, wherein said at least one digital-to-analog converter comprises two digital-to-analog converters, said at least one analog-to-digital converter comprises two analog-to-digital converters, said intermediate frequency signal output comprises a quadrature pair of intermediate frequency signals, wherein said digital memory stores a digital numeric corresponding to each of said quadrature pair of signals, and wherein said two analog-to-digital converters generates a signal corresponding to an associated one of said quadrature pair of signals.

8. The communications transceiver of claim 7, wherdin said digital memory is a pair of FIFO memories having a bit-width greater than one, each coupled to an associated one of said digital-to-analog converters and said analog-to-digital converters for sampling and generating a signal corresponding to an associated one of said quadrature pair of signals.

9. The communications transceiver of claim 5, wherein said digital memory is a FIFO memory.

10. The communications transceiver of claim 4, further comprising:

a frequency measuring subsystem for measuring a measured frequency of a demodulated signal; and a command decoder for receiving a request to transmit a binary representation of said measured frequency, whereby a remote device can determine the deviation of a local oscillator of said downconverter and said upconverter.

11. A communications transceiver, comprising:

a receiver for receiving a first radio-frequency (RF) signal including a downconverter for producing an intermediate frequency signal output during a reception time interval;

a storage for storing frequency and phase information of said intermediate frequency signal output after an end of said reception time interval; and a transmitter for transmitting a second radio-frequency signal, said transmitter including an upconverter for upconverting said stored frequency and phase information of said intermediate frequency signal to produce said second radio-frequency signal, wherein said storage is a phase-lock loop including an oscillator for producing an oscillator output phase-locked to said intermediate frequency signal output and maintaining said oscillator output after said end of said reception time interval.

12. The communications transceiver of claim 11, wherein said phase-lock loop includes a loop filter having a hold state, and wherein said hold state is entered in response to said end of said reception time interval.

13. The communications transceiver of claim 11, further comprising:

a frequency measuring subsystem for measuring a measured frequency of a demodulated signal; and a command decoder for receiving a request to transmit a binary representation of said measured frequency, whereby a remote device can determine the deviation of a local oscillator of said downconverter and said upconverter.

14. The communications transceiver of claim 11, further comprising a command decoder for receiving a request to transmit an upper sideband modulated signal and a lower sideband modulation signal during two subsequent time slots, whereby a remote device can determine the deviation of a local oscillator of said downconverter and said upconverter.

15. A distance measuring system, comprising:

a first communications transceiver for transmitting a first radio-frequency signal from among a plurality of frequencies, and receiving a second radio-frequency signal having a carrier frequency equal to a carrier frequency of said first radio-frequency signal; and a second communications transceiver for receiving said first radio-frequency signal and transmitting said second radio-frequency signal, wherein said second communications receiver transmits said second radio-frequency signal after an end of a reception time interval in which said first radio-frequency signal is received, and wherein said first radio-frequency signal is converted to an intermediate frequency signal and frequency, phase and amplitude information corresponding to said intermediate frequency signal are stored in a storage within said second communications transceiver during said reception time interval, and second radio-frequency signal is generated in conformity with said stored frequency, phase and amplitude information after said end of said reception time interval, and wherein said first communications transceiver further comprises a processing circuit for determining a distance between said first communications and said second communications transceiver in conformity with a return phase of said second radio-frequency signal;

wherein said second communications transceiver, further comprises a command decoder for receiving a request from said first communications receiver to transmit an upper sideband modulated signal and a lower sideband modulation signal during two subsequent time slots, whereby said second commmunications transceiver can determine the deviation of a local oscillator of said second communications transceiver by measuring frequencies of signals received from said second communications transceiver during said two subsequent time slots.

16. The distance measuring system of claim 15, wherein said plurality of carrier frequencies is a set of discrete carrier frequencies, and wherein said first and second communications transceivers receive and transmit signals having a carrier frequency from among said discrete set of carrier frequencies.

17. The distance measuring system of claim 15, wherein said plurality of carrier frequencies is a continuous range of carrier frequencies, and wherein said first and second communications transceivers receive and transmit signals having a continuously varying carrier frequency from within said continuous range.

18. The distance measuring system of claim 15, wherein said storage is a digital memory circuit for storing values encoding said frequency, phase and amplitude information of said intermediate frequency signal.

19. The distance measuring system of claim 18, wherein said storage further comprises:
   at least one multi-bit analog-to-digital converter coupled to said intermediate frequency signal and further coupled to said digital memory circuit for converting said intermediate frequency signal output to a digital numeric sequence and storing said digital numeric sequence during said reception time interval; and
   at least one multi-bit digital-to-analog converter coupled to said digital memory and further coupled to said upconverter for generating a signal corresponding to said digital numeric sequence after said end of said reception time interval.

20. The distance measuring system of claim 19, wherein said at least one digital-to-analog converter comprises two digital-to-analog converters, said at least one analog-to-digital converter comprises two analog-to-digital converters, said intermediate frequency signal output comprises a quadrature pair of intermediate frequency signals, wherein said digital memory stores a digital numeric corresponding to each of said quadrature pair of signals, and wherein said two analog-to-digital converters generates a signal corresponding to an associated one of said quadrature pair of signals.

21. The distance measuring system of claim 20, wherein said digital memory is a pair of FIFO memories having a bit-width greater than one, each coupled to an associated one of said digitalto-analog converters and said analog-to-digital converters for sampling and generating a signal corresponding to an associated one of said quadrature pair of signals.

22. The distance measuring system of claim 15, wherein said second communications transceiver further comprises:
   a frequency measuring subsystem for measuring a measured frequency of a demodulated signal; and
   a command decoder, for receiving a request from said first communications transceiver to return a binary representation of said measured frequency, whereby said first communications transceiver can determine the deviation of a local oscillator of said second communications transceiver.

23. A distance measuring system, comprising:
   a first communications transceiver for transmitting a first radio-frequency signal from among a plurality of frequencies, and receiving a second radio-frequency signal having a carrier frequency equal to a carrier frequency of said first radio-frequency signal;
   a second communications transceiver for receiving said first radio-frequency signal and transmitting said second radio-frequency signal, wherein said second communications receiver transmits said second radio-frequency signal after an end of a reception time interval in which said first radio-frequency signal is received, and wherein said first radio-frequency signal is converted to an intermediate frequency signal and frequency and phase information corresponding to said intermediate frequency signal are stored in a storage within said second communications transceiver during said reception time interval, and second radio-frequency signal is generated in conformity with said stored frequency and phase information after said end of said reception time interval, wherein said first communications transceiver further comprises a processing circuit for determining a distance between said first communications and said second communications transceiver in conformity with a return phase of said second radio-frequency signal, and wherein said storage is a phase-lock loop including an oscillator for producing an oscillator output phase-locked to said intermediate frequency signal and maintaining said oscillator output after said end of said reception time interval.

24. The distance measuring system of claim 23 wherein said phase-lock loop includes a loop filter having a hold state, and wherein said hold state is entered in response to said end of said reception time interval.

25. The distance measuring system of claim 23, wherein said second communications transceiver further comprises:
   a frequency measuring subsystem for measuring a measured frequency of a demodulated signal; and
   a command decoder for receiving a request from said first communications transceiver to return a binary representation of said measured frequency, whereby said first communications transceiver can determine the deviation of a local oscillator of said second communications transceiver.

26. The distance measuring system of claim 23, wherein said second communications transceiver further comprises a command decoder for receiving a request from said first communications receiver to transmit an upper sideband modulated signal and a lower sideband modulation signal during two subsequent time slots, whereby said second commmunications transceiver can determine the deviation of a local oscillator of said second communications transceiver by measuring frequencies of signals received from said second communications transceiver during said two subsequent time slots.

* * * * *

UNITED STATES PATENT AND TRADEMARK OFFICE
CERTIFICATE OF CORRECTION

| | |
|---|---|
| PATENT NO. | : 7,139,581 B2 |
| APPLICATION NO. | : 10/137954 |
| DATED | : November 21, 2006 |
| INVENTOR(S) | : Berliner et al. |

It is certified that error appears in the above-identified patent and that said Letters Patent is hereby corrected as shown below:

The last inventor name is spelled incorrectly on the title page. The title page showing the Inventors' names should be corrcted as seen below:

Title page, last inventor should read --Daniel Aljadeff, Kiriat Ono (IL)--

Signed and Sealed this

Nineteenth Day of June, 2007

JON W. DUDAS
*Director of the United States Patent and Trademark Office*